(12) United States Patent  
Graham

(10) Patent No.: US 9,179,594 B2
(45) Date of Patent: Nov. 10, 2015

(54) SEEDING MACHINE CONTROLLER FOR AUTOMATICALLY SWITCHING BETWEEN MULTIPLE SEED VARIETIES

(71) Applicant: Deere & Company, Moline, IL (US)

(72) Inventor: Charles T. Graham, CO Springs, CO (US)

(73) Assignee: DEERE & COMPANY, Moline, IL (US)

( * ) Notice: Subject to any disclaimer, the term of this patent is extended or adjusted under 35 U.S.C. 154(b) by 235 days.

(21) Appl. No.: 13/714,980

(22) Filed: Dec. 14, 2012

(65) Prior Publication Data

US 2014/0165890 A1    Jun. 19, 2014

(51) Int. Cl.
*A01C 9/00* (2006.01)
*A01C 7/04* (2006.01)
*A01C 7/10* (2006.01)
*A01C 21/00* (2006.01)

(52) U.S. Cl.
CPC . *A01C 7/04* (2013.01); *A01C 7/046* (2013.01); *A01C 7/10* (2013.01); *A01C 7/107* (2013.01); *A01C 21/00* (2013.01); *A01C 21/005* (2013.01)

(58) Field of Classification Search
USPC .......... 239/656; 111/170, 174, 200, 900, 903; 701/1, 36, 50
See application file for complete search history.

(56) References Cited

U.S. PATENT DOCUMENTS

| | | | |
|---|---|---|---|
| 5,170,909 A | | 12/1992 | Lundie et al. |
| 5,915,313 A | * | 6/1999 | Bender et al. .................. 111/178 |
| 6,070,539 A | * | 6/2000 | Flamme et al. ............... 111/177 |
| 6,193,175 B1 | | 2/2001 | Andersson et al. |
| 6,527,205 B2 | | 3/2003 | Andersson et al. |
| 6,609,468 B1 | | 8/2003 | Meyer et al. |
| 6,688,244 B1 | | 2/2004 | Meyer et al. |
| 6,845,724 B2 | | 1/2005 | Mayerle et al. |
| 7,025,010 B2 | | 4/2006 | Martin et al. |
| 2012/0036914 A1 | | 2/2012 | Landphair et al. |
| 2012/0042815 A1 | | 2/2012 | Wonderlich |
| 2012/0226461 A1 | | 9/2012 | Kowalchuk |

OTHER PUBLICATIONS

International Search Report and Written Opinion of the International Searching Authority, dated Apr. 23, 2014 (6 pages).

* cited by examiner

*Primary Examiner* — Alicia Torres

(57) ABSTRACT

A seeding machine, such as a row crop planter, is adapted to switch between two or more seed varieties as the machine traverses a field. The control system uses a programmed quantity of seed representing a number of seeds in the seed meter that need to be substantially consumed once the flow of a first seed variety is stopped before introducing a second seed variety to minimize seed mixing. The seed quantity can be determined by a calibration process or published from the manufacturer or third parties. The seed quantity can also be part of a seeding prescription that includes assignment of where each seed variety is to be planted in a field. The seed quantity and the distance traveled to empty the meter can be used to optimize the planting operation including the machine direction which can also be part of the prescription.

4 Claims, 8 Drawing Sheets

SEEDING MACHINE CONTROLLER FOR AUTOMATICALLY SWITCHING BETWEEN MULTIPLE SEED VARIETIES

FIELD

This disclosure relates to seeding machines such as row crop planters adapted to plant two or more seed varieties within a field and in particular to the control of such a machine.

DESCRIPTION

Most crop production is carried out by seeding an entire field with one seed variety. However, sufficient agronomic data is now available to utilize site specific planting prescriptions that use two or more seed varieties in a given field to increase yields. Various factors are used to determine the best variety for a given location. One area of a field may be lower and typically wetter than other areas. The increased moisture alone may suggest a different seed variety in that location. In addition, the moisture may result in increased weed or pest pressure in that location necessitating other varieties with resistance to those pressures. To plant the field most efficiently with parallel back and forth passes, and to plant with multiple site specific varieties, it is necessary to switch back and forth between varieties numerous times based on the location of the machine in the field.

Figure 1:
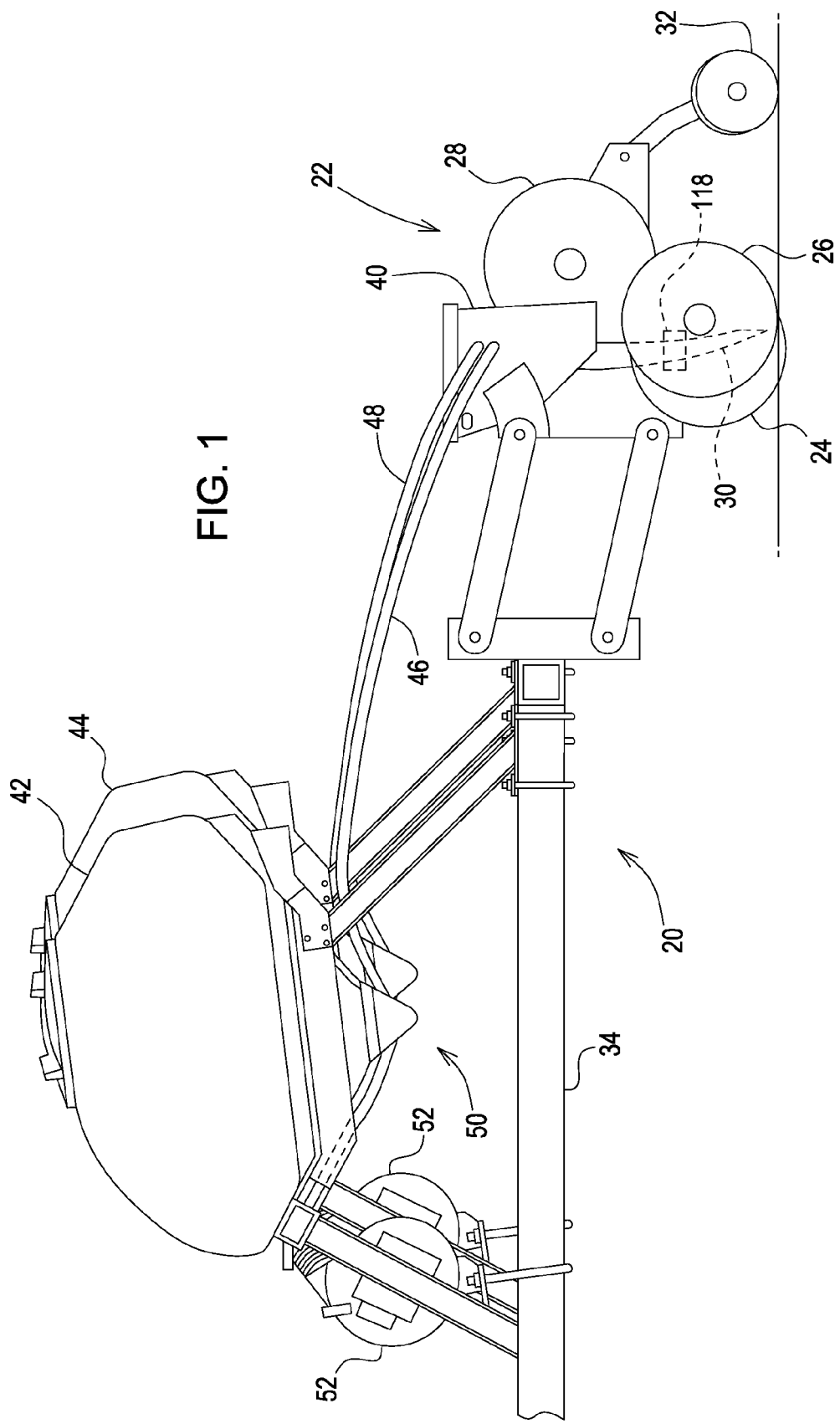
FIG. 1 is a schematic side view of a planter illustrating one row unit and two seed supply tanks of a seed delivery system.

With reference to FIG. 1, a seeding machine, in the form of a row crop planter 20, is shown which is capable of switching between seed varieties without stopping the machine. Planter 20 is equipped with multiple planting row units 22, only one of which is shown. Row unit 22 is only one example of many different types of row units that can be used to plant seed. Row unit 22, as shown, includes an opener 24 that forms a shallow furrow in the soil as the machine traverses a field. Gauge wheels 26 control the depth of the furrow. A seed meter 28 meters seed to deliver individual seeds sequentially to a seed tube 30 that directs the seed to the furrow beneath the meter. A closing wheel or other device 32 trails behind and covers the deposited seed with soil. Each row unit 22 is mounted to the machine frame 34. Multiple row units 22 are mounted to the frame 34 such that multiple parallel rows are planted with each pass of the machine through a field.

Each seed meter is equipped with a small seed hopper 40 commonly referred to as a mini-hopper. Seed from two or more tanks 42, 44 is delivered to the mini-hopper pneumatically through tubes 46, 48. Alternatively, the mini-hopper could be eliminated and the tubes 46, 48 connected directly to the meter housing. A tube 46 extends from tank 42 to the mini-hopper 40 and a tube 48 extends from the tank 44 to the mini-hopper 40. Each tank 42, 44 carries a different seed variety such that each variety is delivered to the each mini-hopper. The tanks and tubes are part of a pneumatic seed delivery system 50 such as those shown in U.S. Pat. Nos. 6,609,468; 6,688,244; and 7,025,010, incorporated herein by reference. Seed delivery system 50 also includes a fan 52 to provide the air stream to convey the seed through the tubes 46, 48. In place of the seed delivery system 50, the planter could be equipped with larger hoppers on each row unit to supply the seed to each meter.

Figure 2:
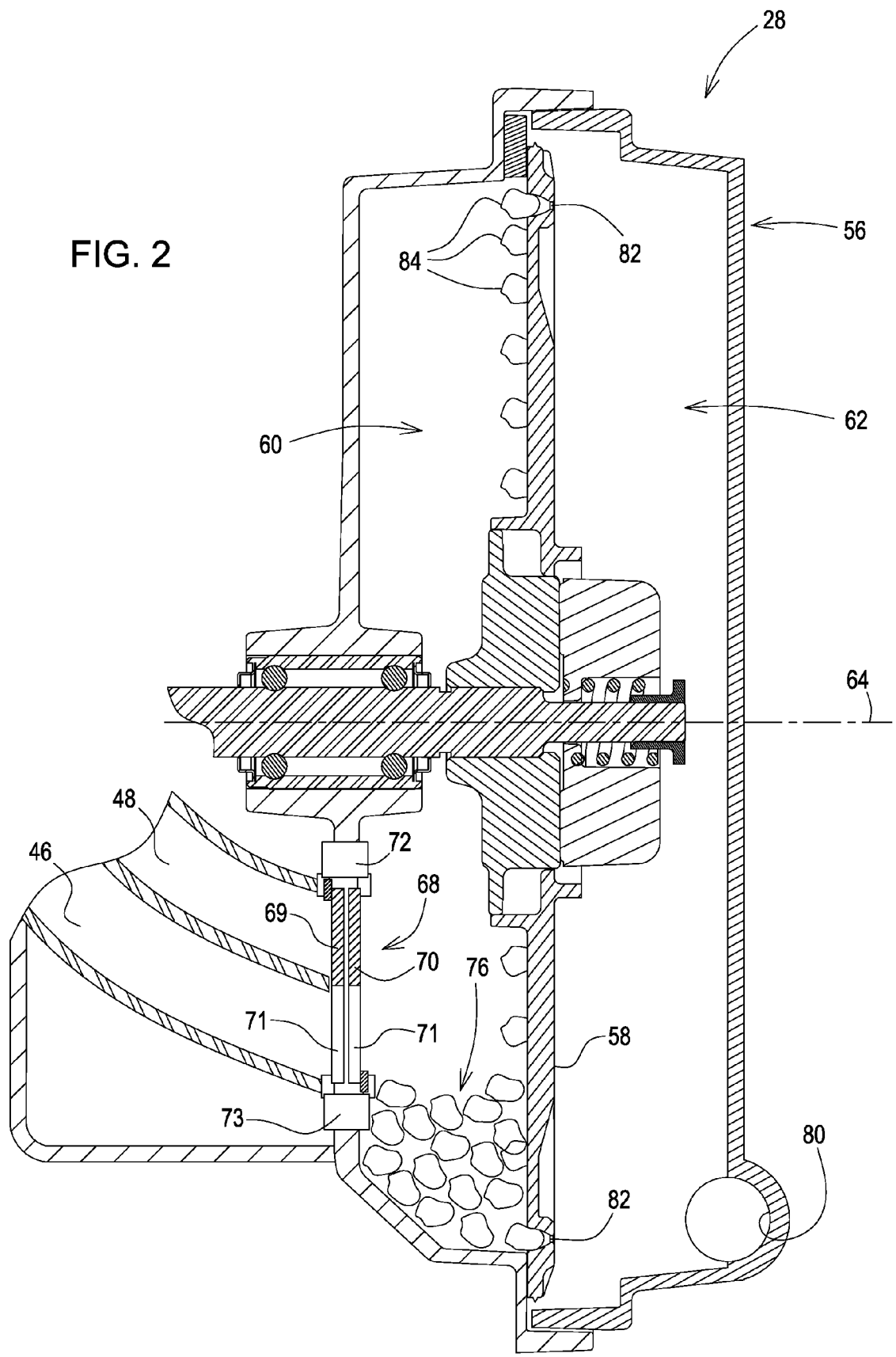
FIG. 2 is a sectional view of a vacuum seed meter.

Seed meter 28 is shown in greater detail in FIG. 2. The meter 28 is a vacuum seed meter which operates with a pressure differential to select individual seeds for delivery to the seed tube 30. While the meter 28 is a vacuum meter, other pressure differential meters use a positive pressure instead of vacuum. While a pressure differential meter provides some advantages described below, a mechanical meter, such as a finger pick-up meter may be used as well. Meter 28 includes a housing 56. A seed disk 58 divides the interior of the housing into two chambers, a seed chamber 60 and a vacuum chamber 62. The seed disk 58 is mounted in the housing for rotation about an axis 64. The meter is a vacuum seed meter such as the meter shown in U.S. Pat. No. 5,170,909 incorporated herein by reference.

The tubes 46, 48 pass through the mini-hopper and terminate near the bottom of the hopper, at a switching mechanism 68. The switching mechanism 68 may be of the type shown in U.S. Pat. No. 6,193,175, incorporated herein by reference. The switching mechanism 68 has two rotary gates 69, 70 each having an opening 71 there through for passage of seed. Gate 69 is rotated by an actuator 72 while gate 70 is rotated by an actuator 73. As shown in FIG. 2, the openings 71 of both gates are aligned with the tube 46 allowing seed variety A from tube 46 to enter the meter housing. The gates can both be rotated to align the openings 71 with the tube 48 allowing seed variety B from tube 48 to flow into the meter housing. Since each gate is separately controlled, one gate can close tube 46 while the other gate closes tube 48 to prevent both seed varieties from entering the meter housing. This allows the seed variety in the meter to be exhausted before introducing the other variety as described below. The illustrated switching mechanism 68 is only one example of a switching mechanism, other mechanisms can be used. When the switching mechanism 68 opens either tube 46 or 48, seed from the respective tank is allowed to flow into the seed chamber of the meter housing and accumulate in a seed pool 76 in the housing.

The meter housing 56 includes a hose fitting and opening 80 to the vacuum chamber 62 on the side of the seed disk opposite the seed pool 76. The fitting is connected to a hose, not show, which is coupled to the inlet side of a vacuum fan to produce a vacuum in the chamber 62. The seed disk 58 has a circular array of apertures 82 extending through the disk near its periphery. The apertures 82 extend through the disk from the seed side to the vacuum side. As the seed disk rotates, the vacuum on one side of the disk causes individual seeds to be adhered to the disk on the seed side, at the apertures 82 as shown by seeds 84 at the top of the disk in FIG. 2. After the seed is rotated to the release location, the vacuum is cut-off, allowing the seed to fall sequentially into the seed tube 30 to the furrow in the soil. Other types of seed meter can also be used including, but not limited to, positive pressure meters or mechanical meters such as a finger pick-up meters, etc.

Figure 3:
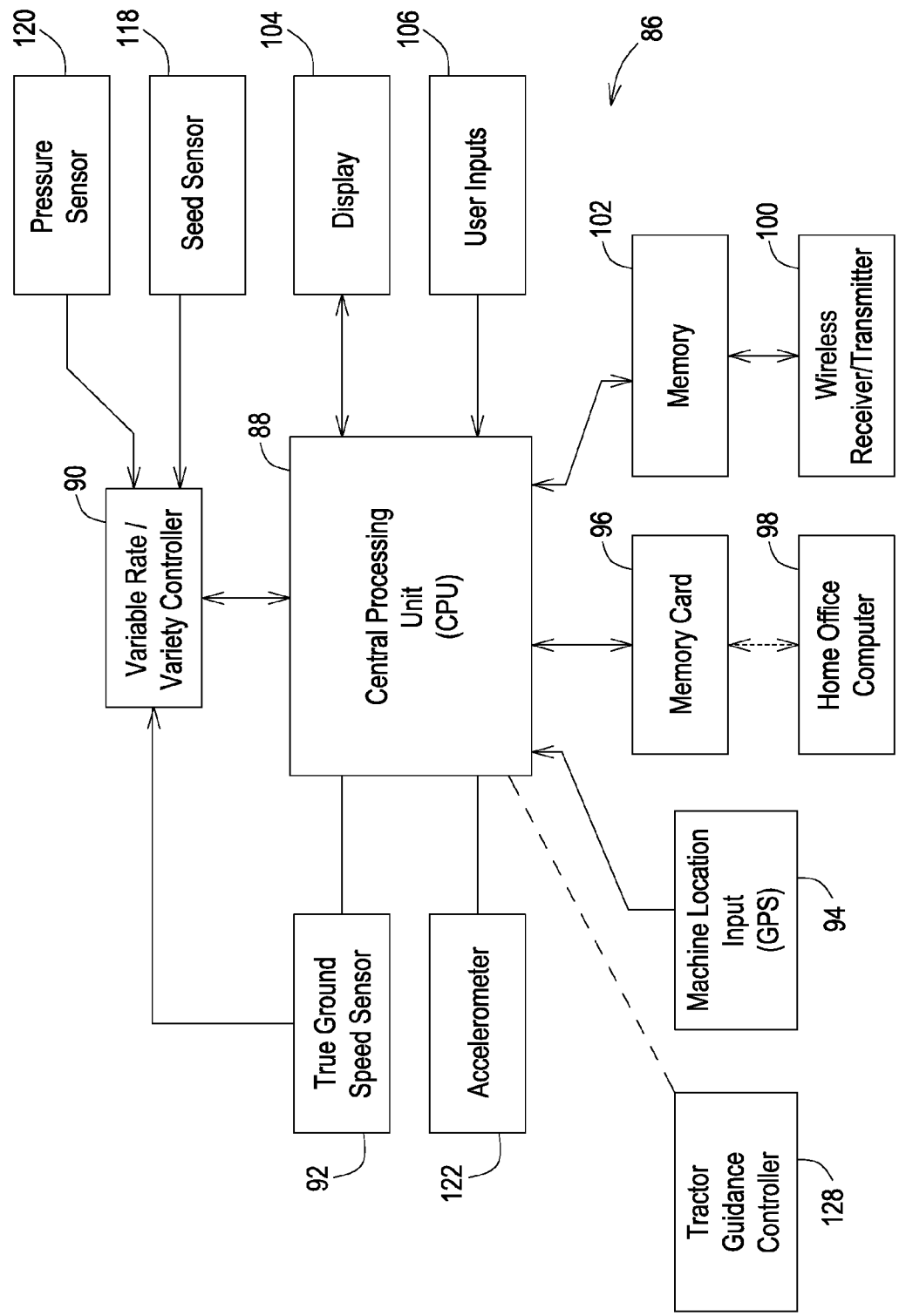
FIG. 3 is a schematic diagram of a controller.

A controller 86 for controlling the function of the planter 20 is shown in FIG. 3. Controller 86 is only an example of a controller architecture to illustrate the control functions. The hardware architecture may vary. Controller 86 includes a central processing unit, CPU, 88 and a variable rate/variety controller, VRVC, 90. The VRVC 90 controls the operation of the actuators 71, 72 to rotate the gates 69, 70 to determine which seed variety flowing into the meter housing. VRVC 90 also controls the rotation speed of the seed disk 58 to determine and vary the seed application rate, that is, the number of seeds per unit of area, e.g. seeds per acre. Both the CPU 88 and VRVC 90 receive vehicle speed input from true ground speed sensor 92. Further inputs to the CPU include machine location data input 94 such as GPS data providing geo-referenced location of the machine. A memory card 96 with prescription data from a home office computer 98 or other computer provides data to the CPU of which variety of seed is to be planted at each location in the field and at what application rate. A wireless input device 100 may also be provided to transmit a prescription wirelessly to a memory device 102. A visual display 104 is provided to deliver information to the operator. The display may be touch screen to allow for user inputs and/or other user input devices 106 may be provided such as knobs, switches, keyboard, voice commands, etc.

Figures 4, 5:
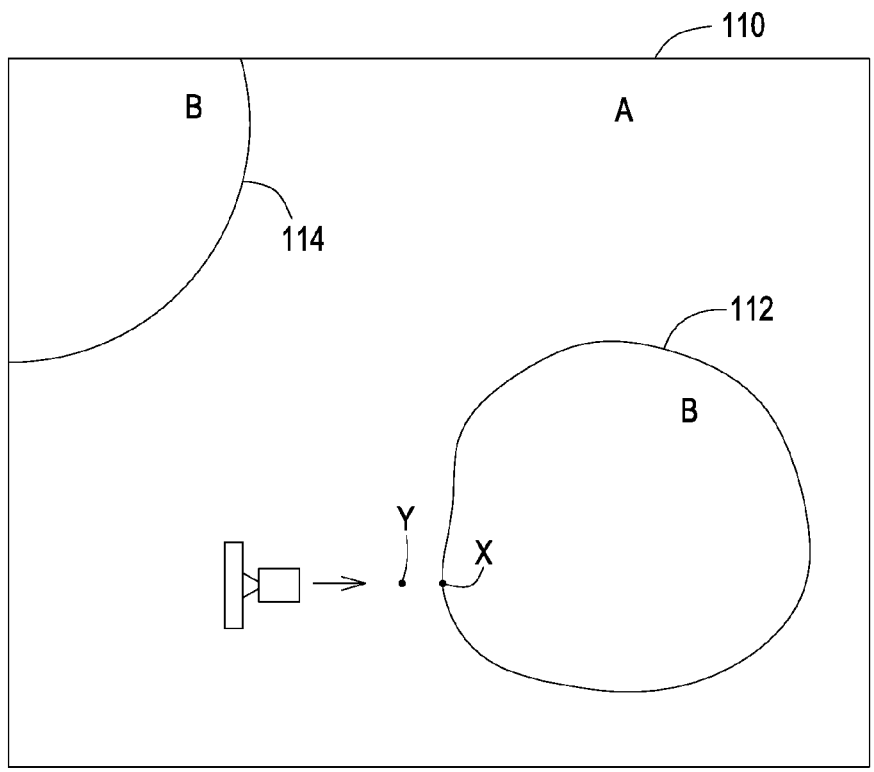
FIG. 4 is a top view of a field map.
FIG. 5 is a top view of the field of FIG. 4 illustrating pixels for a seeding prescription.

A field map is shown in FIG. 4 wherein locations in a field 110 for planting each of two seed varieties A and B are indicated. Most of the field is to be planted with variety A while the areas within the irregularly shaped polygons 112, 114 are to be planted with variety B. Polygon 112 is contained within the field 110 while polygon 114 is defined in part by the boundaries of the field 110. The controller 86 can control the variety based on where the planter 20 is located with respect to the boundaries of the two polygons 112, 114. If the planter is outside the polygons, plant variety A and if the planter is inside the polygons, plant variety B. Alternatively, with reference to FIG. 5, the field can be divided into a number of small rectangular areas or pixels. Each pixel is geo-referenced and has a seed variety A or B assigned thereto and a seeding rate in a seeding prescription. When the planter is in a given pixel, it plants the variety assigned to that pixel. With either type of field designation, the controller 86 must be programmed to look ahead at the current path to anticipate changes in seed variety as described below. While two seed varieties are described, it will be apparent that the more than two varieties can be planted in a given field with equipment so equipped.

When switching from one variety to another, it is desirable to minimize the mixing of the two seed varieties so that when switching from variety A to variety B there is only a small region in the field where the two varieties are mixed together before planting solely variety B. To minimize mixing of varieties, gates 69 and 70 are rotated to positions closing both tubes 46 and 48. This allows the seed in the seed pool 76 to be substantially exhausted before opening tube 48 to allow variety B to flow into the meter. While crisp switch in varieties may be preferred, some mixing of seed is better than allowing the meter to run completely empty and leaving an area in the field not planted. When the tractor 116, FIG. 4, approaches the boundary of the polygon 112, the controller 86 must stop variety A from flowing into the meter a sufficient distance before reaching the polygon to allow seed A to be depleted and then introduce seed B into the meter just in time to begin planting seed B at the boundary of the polygon. To do so, the controller needs to know the number of seeds in the seed pool 76 at the time when stopping seeds of variety A from flowing into the meter. Using the number of seeds, also referred to as the size of the seed pool, together with the seeding rate or rates between the current location and the point X on the polygon boundary where the planter needs to begin planting seed B (FIG. 4), the controller determines a point Y at which to stop the supply of seed A into the meter.

To determine the location Y, the size of seed pool 76 must be known. The controller is adapted to utilize a programmed quantity of seed in the seed pool 76 for making this calculation. The programmed quantity of seed is based on the seed size and the geometry of the seed meter housing. Seeds of variety A may be of a different size than the seeds of variety B. Furthermore, due to the physical geometry of the meter, for example, the different locations of the lower ends of the tubes 46 and 48 supplying the seed to the meter, the programmed quantity of seed in the seed pool may be different for each seed variety. One way to know the seed pool size is to perform a calibration process as part of a planter set-up. The calibration process includes the steps of filling the meter housing with seed A, operating the seed meter at least until all the apertures on the seed disk are filled with seed and seed begins to fall through the seed tube as detected by seed sensor 118 on the seed tube 30. The switching mechanism 68 is then moved to a position closing both tubes 46 and 48, stopping the supply of additional seed A to the meter. The meter continues to operate until the seed pool in the meter is exhausted while the seed sensor 118 counts the number of seeds delivered by the seed meter. The number of seeds counted is the "Seed Count to Empty" for variety A.

To avoid running the seed meter completely empty of seed when switching, some minimum number of seeds, for example twenty seeds, needs to be present in the meter at all times. The Seed Count to Empty, less the minimum number of seeds, is the programmed quantity of seed supplied to the controller for calculating when to stop supply of seed A during a switch. Once the programmed quantity of seed is determined for variety A, the meter is then filled with seeds of variety B and the calibration process repeated. The supply of seeds B to the meter is stopped and the meter is run until empty while counting the number of seeds. The "Seed Count to Empty" for variety B less the minimum number of seeds, becomes the programmed quantity of seed for variety B.

If the seed meters of the planter are driven by motors, such as electric or hydraulic motors, the calibration process described above can be performed when the planter is static before operating in a field. Alternatively, and for all planters having meters driven by ground wheels, the planter can be operated in the field for the calibration process. In doing so, one row is used for the calibration where supply of seed A is stopped to allow the size of the seed pool to be counted. Since the meter is run empty during the calibration process, there could be a one time, one row gap in planting of several feet for each variety.

The programmed quantity of seed can also be determined without running the meter to empty by sensing operational parameters of the meter that indicate it is near empty. As the seed pool nears empty, the disk will travel through a smaller number of seeds. Before the meter completely empties, the frequency of seed skips, as detected by the seed sensor 118, will increase. The count of seeds up to the time when the skip frequency increases can be used as the programmed quantity of seed for that variety. Likewise, as the seed pool becomes smaller, more apertures on the seed disk will be open between the release point and the seed pool, due to the smaller size of the seed pool. The additional open apertures will result in a drop of vacuum pressure in the vacuum chamber. When a decrease in the vacuum pressure is detected by pressure sensor 120, the seed count reached up to that point becomes the programmed quantity of seed. The pressure in a positive pressure meter will also likely decrease as the seed pool size deceases to near empty. When either of these operational parameters show a change that indicates the seed pool is near empty, the seed count up to that point in time can then be used as the programmed quantity of seed. It is possible that other operational parameters can be used to detect a near empty condition of the meter. The above mentioned minimum number of seeds ideally is the number of seeds needed in the meter to avoid any operational parameter from indicating a decline in meter function.

The programmed quantity of seed can also be published data that the operator then inputs into the controller 86 through one of the input devices 104 or 106. The data can be published following testing by the planter manufacturer, the seed company, a third party testing service, etc. The seed company could test and publish, for each seed variety, a table of programmed quantity of seed values for common planter models. It is expected that seed companies or third party agronomists will prepare and supply to a producer a prescription of the seed varieties and seeding rates for a given field. The prescription can include the programmed quantity of seed to be used in operating the planter.

The planter is operated using the programmed quantity of seed to determine when to stop supplying one seed variety to the planter before introducing the next seed variety into the meter when making a switch between varieties. The controller uses the programmed quantity of seed and the application rate to determine a "Distance to Empty." The controller is also looking forward along a current path and determines a "Distance to Switch" representing the distance of the planter from the point X on the boarder of the polygon 112, FIG. 4. As long as the Distance to Switch is greater than the Distance to Empty, more seed than the programmed quantity of seed in the meter is needed to plant to the switch point. When the Distance to Switch equals the Distance to Empty, the planter is at point Y. The supply of seed variety A to the meter is stopped and the programmed quantity of seed in the meter is the amount of seed needed to plant from the point Y to the point X where the switch needs to occur. When the planter reaches point X, the number of seeds in the meter should be equal to the minimum number of seeds. At this point, seed of variety B is supplied to the meter.

To ensure minimal mixing of varieties and to ensure proper operation of the seed meter, it is recommended to monitor planter performance during switching operations and make adjustments to the programmed quantity of seed as necessary. This is done by counting the seeds delivered by the meter once seed supply to the meter is stopped to verify that the programmed quantity of seed is accurate. If not, the programmed quantity of seed is adjusted to a new value. For example, if during operation, there is a decrease in the planter performance as detected by the operational parameters mentioned above before the programmed quantity of seed has been delivered by the meter, this indicates that the programmed quantity of seed is greater than the actual quantity of seed in the meter. When the controller detects a decrease in planter performance, the count of seeds at the time of the change in the operational parameter becomes the new programmed quantity of seed. However, if there is no change in the operational parameters at the time when the meter is near empty, it may indicate that the programmed quantity of seed is less than the actual number of seeds in the meter. This would result in more mixing of seed then desired at the switch. If this occurs, the controller can increase the programmed quantity of seed slightly before for the next switch to arrive at a more precise number of the actual seeds in the meter. For instance, the programmed quantity of seed may be increased one percent for the next switch and then the operational parameters monitored to determine if the new programmed quantity of seed is correct. In this manner, the controller gradually reaches a more precise programmed quantity of seed.

Figure 6:
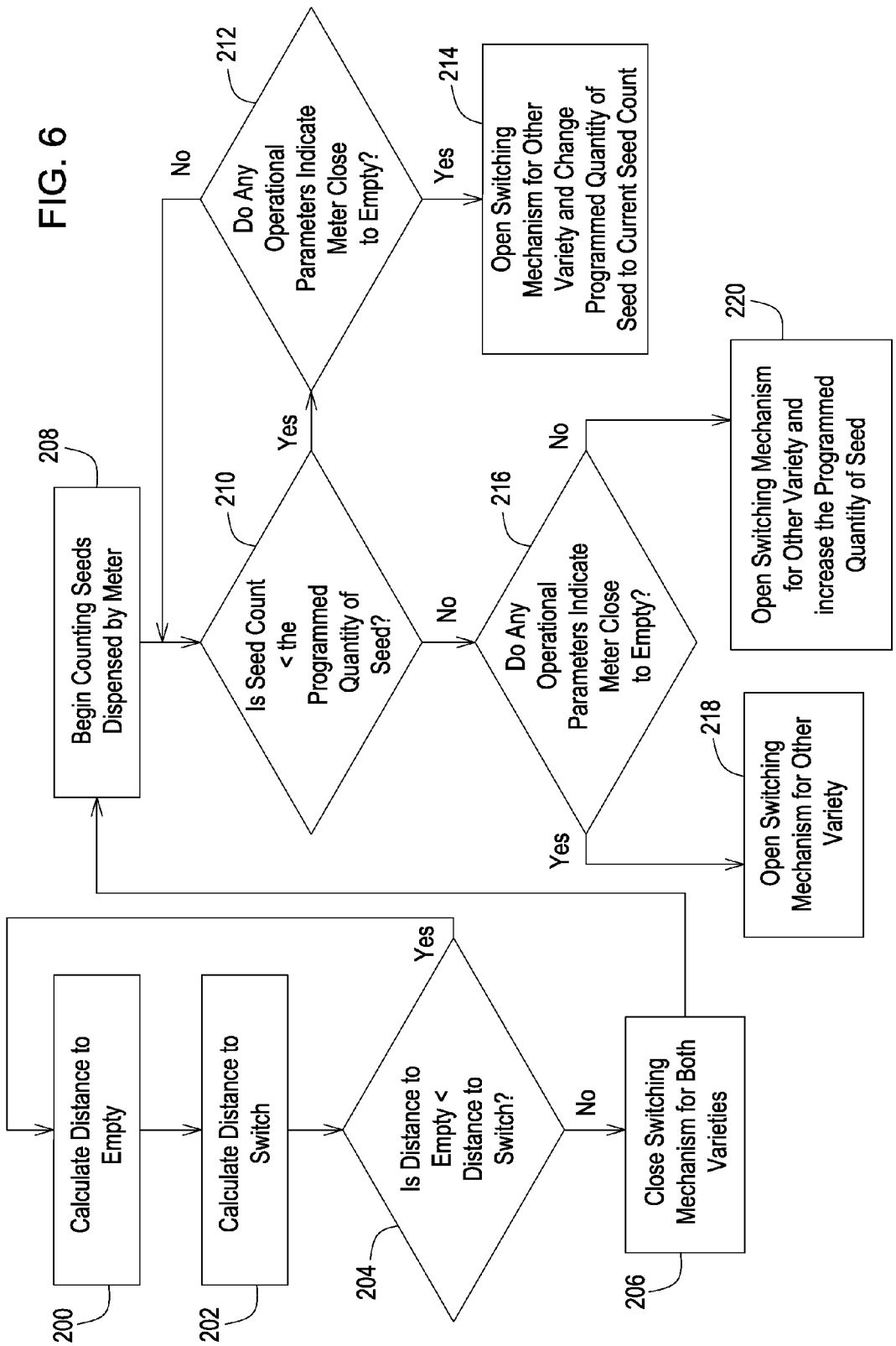
FIG. 6 is a flow chart of the control process.

The process for determining when to operate the switching mechanism is shown in FIG. 6 Starting with box 200 the controller calculates the Distance to Empty based on the programmed quantity of seed and the application rate or rates between the current location and the switch point X. In box 202 the controller calculates the Distance to Switch, that is, the distance between the current location and the boarder of one of the polygons 112 or 114 along the current path. In diamond 204 the controller determines if the Distance to Empty is less than the Distance to Switch. If no, the current quantity of seed in the meter is not enough to reach the switch point, more seed is needed. Operation of the planter continues and the controller returns to box 200 and repeats the process. If yes, the quantity of seed in the meter is sufficient to reach the switch point without any additional seed. The controller moves to box 206 and actuates the switching mechanism 68 to close both tubes and stop flow of seed into the meter. The meter then begins to empty and the seeds dispensed are counted, box 208.

The controller then determines if the current seed count is less than the programmed quantity of seed in diamond 210. If yes, there should still be seed in the meter. However, it is possible the programmed quantity of seed was too high. To check for this, the controller, in box 212 checks to see if any operational parameter of the meter indicates it is close to empty. If no, the controller returns to diamond 210. If yes, this indicates that the programmed quantity of seed was greater than the actual number of seeds in the meter and the meter is almost empty even though the seed count is less than the programmed quantity of seed. If this occurs, the controller moves to box 214. There, the switching mechanism 68 is actuated to open the other variety to the meter and the programmed quantity of seed for the previous variety is changed to the current seed count. The controller then returns to the beginning at box 200.

If in the diamond 210 the seed count is not less than the programmed quantity of seed, than the planter has used all the programmed quantity of seed and the planter should be at the switch point X. The controller moves to diamond 216 to determine if the operational parameters are indicating that the meter is close to empty. If yes, this confirms that the programmed quantity of seed is an accurate number. The controller moves to box 218 and actuates the switching mechanism 68 to open the supply of the next variety of seed to the meter. The controller then returns to box 200 to look for the next switch. If there is no decrease in any operational parameter in box 216, the controller moves to box 220. There the controller also actuates the switching mechanism 68 to open the supply of the next variety of seed to the meter but since the operational parameters do not indicate the meter is close to empty, the controller slightly increases the programmed quantity of seed for the next switch, for example, increase the programmed quantity of seed by 1%. The controller then returns to box 200 for the next switch. The controller thus fine tunes the programmed quantity of seed to achieve an accurate number of the seeds in the meter for each variety.

Figure 7:
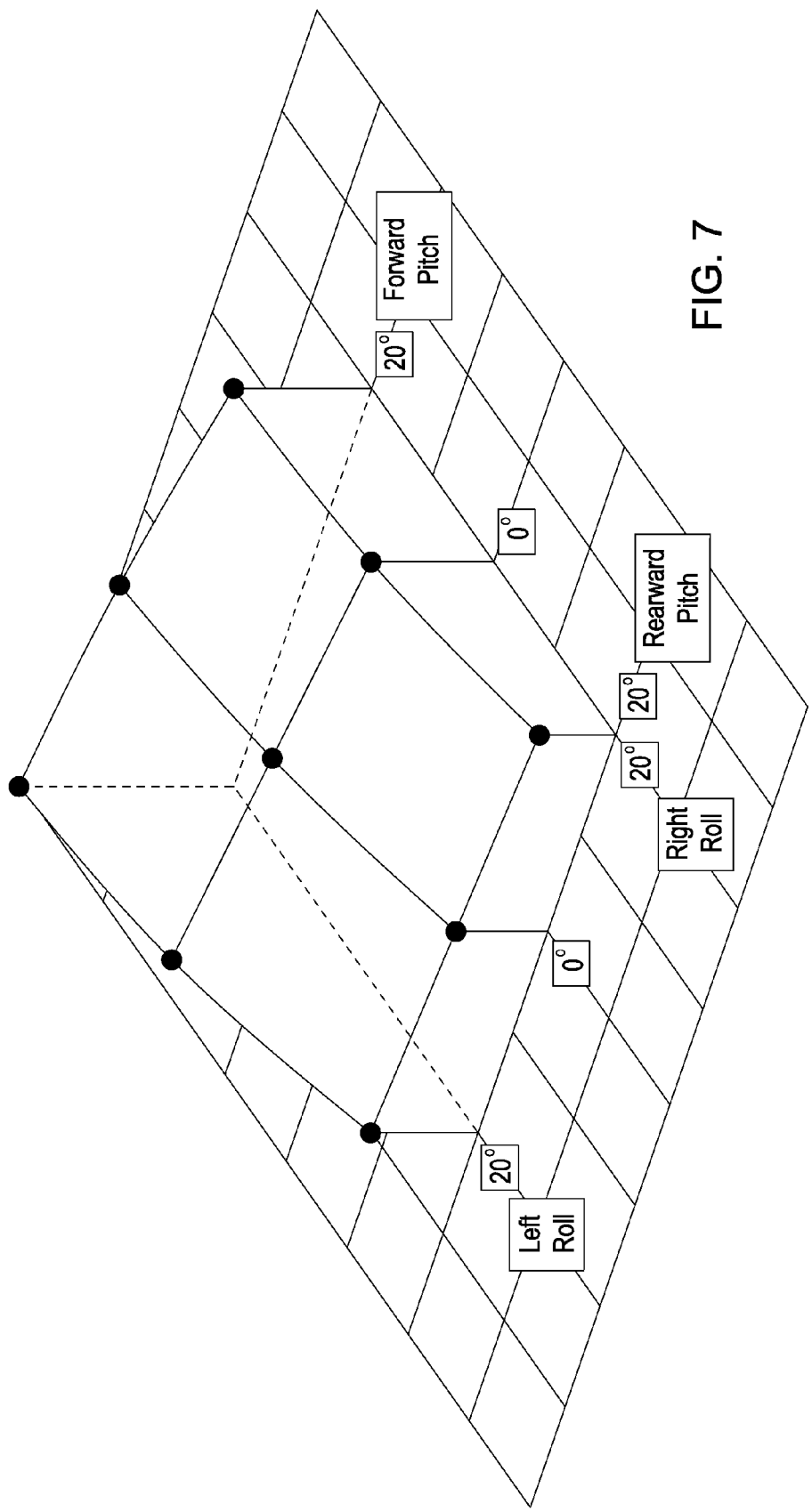
FIG. 7 is a three dimensional graph illustrating variation in the programmed quantity of seed in the seed meter based on attitude of the planter.

The seed pool size can also change based on the attitude of the planter. Using machine attitude data from an accelerometer 122 mounted to the planter 20, the programmed quantity of seed can be adjusted. The adjustment can be made based on known test data that shows a percentage increase or decrease in the seed pool size based on the angle of inclination of the planter both in left or right roll and forward or backward pitch. An example of variations in the programmed quantity of seed due to machine attitude is shown in FIG. 7. In the absence of test data to adjust the programmed quantity of seed, the operational parameters as mentioned above can be used to detect variations in the number of seed in the seed meter for variations in the machine attitude and make adjustments to the programmed quantity of seed based on machine attitude. As the machine attitude changes, the controller determines a new Distance to Empty based on the changing programmed quantity of seed.

For planters having a common seed meter used for all seed varieties and where switching between varieties is accomplished by changing the variety of seed that is supplied to the meter, the programmed quantity of seed is a parameter needed to develop a seed variety prescription. The programmed quantity of seed determines a minimum distance that must be covered with a given seed variety before switching to another variety. For example, once a switch has been made from variety A to variety B and the seed meter is filled with seed B, the planter will have to travel a Distance to Empty to consume seed B in the meter before there can be a switch back to seed variety A. The prescription should consider the programmed quantity of seed and the Distance to Empty calculated therefrom in determining the prescription. The effect of the Distance to Empty can be used one of two ways. If the distance to be covered with the second seed variety is smaller than the Distance to Empty, the prescription could simply not make the switch to the second seed variety. Or, the second seed variety could be used over a larger area then desired for the prescription by overlaying a portion of the second variety on an area where the first variety would be desired. Preferably, the prescription would center the second variety over the area desired so that switching points would be even on both sides of a the area for variety B. See FIG. 8. There a field 130 mostly planted with a variety A. The field has a narrow band 132 to be planted in variety B. The width of the band 132 is narrower than the minimum switching distance of the planter shown by the rectangular blocks 134. If each switch is accomplished as the planter reaches the band 132, the blocks planted with variety B would be staggered as shown at the top of the FIG. 8 where the arrows show the planter travel direction. However, if the prescription takes into consideration the size of the minimum switching distance, the blocks 134 can be centered on the band 132 as shown by the three blocks near the bottom of FIG. 8.

Figure 9:
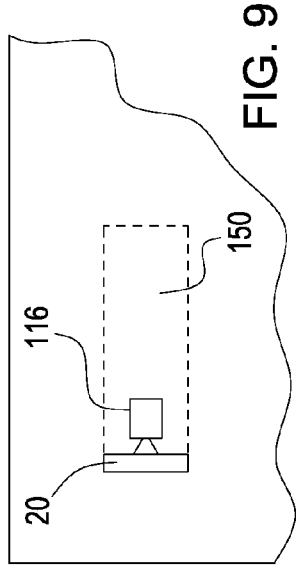
FIG. 9 is a plan view of a field illustrating a planter Common Variety Area.

The Distance to Empty, which is measured in planter travel distance, is likely a different number than the machine width that is capable of separate control. Thus, for any given location of the planter 20 and tractor 116 in a field, there is a field area, forward of the planter known as a Common Variety Area 150, which must be planted with the current seed variety in the meter. The length of the Common Variety Area is the Distance to Empty and the width is the narrowest area of the planter capable of separate control. In the example of FIG. 9, the width of the Common Variety Area is the width of the planter. If smaller sections of the planter can be separately controlled, for example, three sections, there are three Common Variety Areas, 150A, 150B and 150C extending forward from the planter as shown in FIG. 9. If each row unit is separately controlled for seed variety, then there would be a separate Common Variety Area for each row unit. The Common Variety Area moves forward with the planter as the planter moves across the field.

Figure 8:
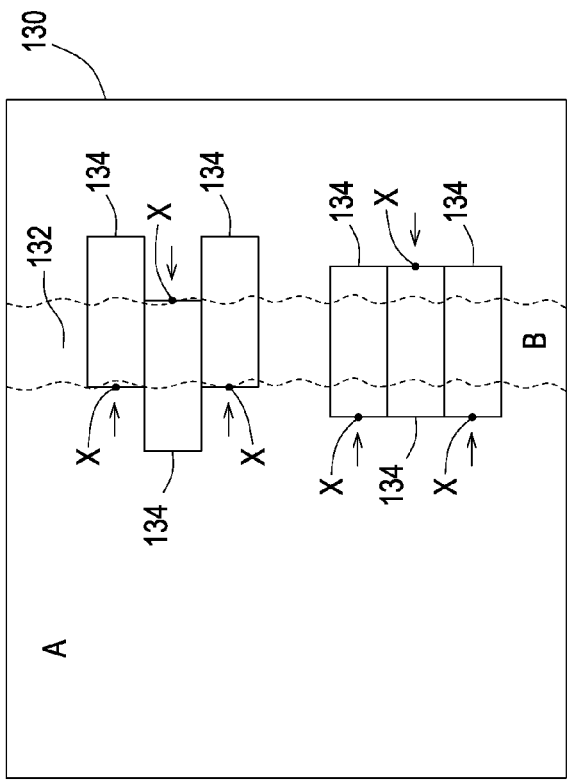
FIG. 8 is a plan view of a field illustrating variety prescription optimization.
Figure 10:
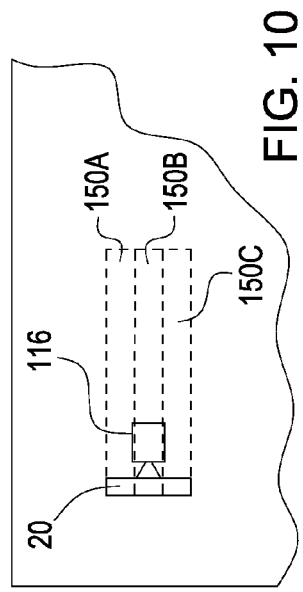
FIG. 10 is a plan view like FIG. 9 illustrating an alternative Common Variety Area for a planter.

To optimize a variety prescription for a given field, the prescription should consider the size of the Common Variety Area. This was done as shown in FIG. 8 by centering the Common Variety Area, shown by the blocks 134 over the band 132. Furthermore, an optimized prescription can include a path plan for the planter taking the Common Variety Area into consideration. For example, with reference to FIG. 10, the field 160 has a gulley 162 running across the field that is generally wetter and could benefit from a different variety from the rest of the field. But the width 164 of the gulley area is shorter than the length of the Common Variety Area 150 of the planter in the usual direction of travel for planting, side-to-side as viewed in FIG. 11. The prescription may be optimized, however, by planting top-to-bottom so that the length of the Common Variety Area 150' can be better aligned with the gulley area 162. Harvesting machine efficiency should also be considered in planter path planning. Changing the planting direction may be most practical when the crop is to be harvested with a row-insensitive harvesting machine.

Figure 11:
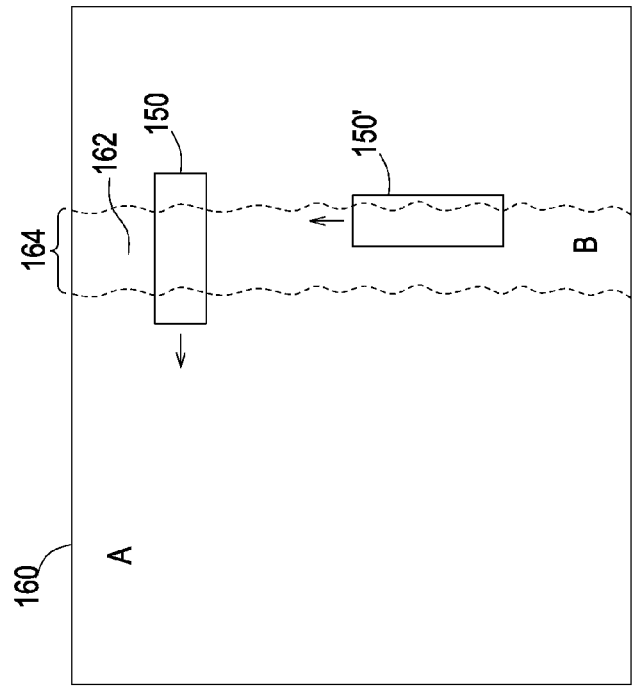
FIG. 11 is a plan view of a field illustrating another variety prescription optimization including a path plan for the planter.

Optimization of the prescription occurs when the area of the field that is not planted with the optimal variety in minimized. Since the Common Variety Area is not always the same dimension in both directions, an optimized prescription needs to include a planter path plan. The path plan can be executed automatically if the tractor is equipped to automate the tractor steering or the path plan can be shown to the operator for manual driving of the tractor. For automated control, the CPU 88 can be adapted to communicate with a tractor guidance controller 128 adapted to receive detailed path plan instructions for automated guidance of the tractor 116. The path plan may be as simple as which direction to plant the field as shown in FIG. 11. In this case, the controller displays on the display 104 the desired direction for planting of the field.

An optimized prescription with a path plan may be accomplished by planting all or substantially all of the area requiring one variety before switching to the other variety and planting the remainder of the field. This prescription may be optimized to minimize the number of switches. For example, with reference to FIG. 12 a field 170 is shown, most of which is planted with variety A. One corner area 172 is planted with variety B. The area 172 is planted first along the path shown by the arrows 174 with the planter turning in the headland 176 at the end of the field and turning at the other end outside the area 172. The headland 176 can be planted before or after the back and forth passes in the area 172. After area 172 is planted, one variety switch is made and the remainder of the field is planted with variety A. This can be accomplished with an internal headland area 178 surrounding the area 172. In this headland area, the planter is turned when making the back and forth passes as shown by the arrows 180. With such a planting pattern, the headland 178 would need to be harvested first before the back and forth harvesting of the remainder of the field.

Figure 12:
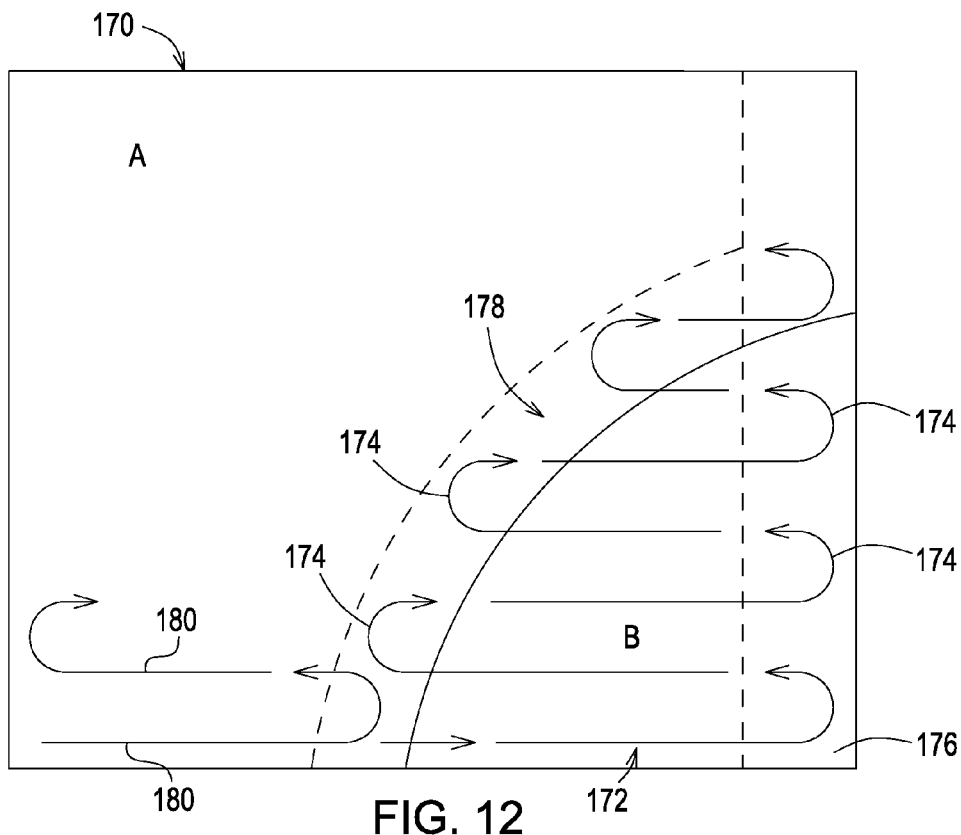
FIG. 12 is a plan view of a field illustrating another variety prescription optimization including a path plan for the planter to minimize variety switching.
Figure 13:
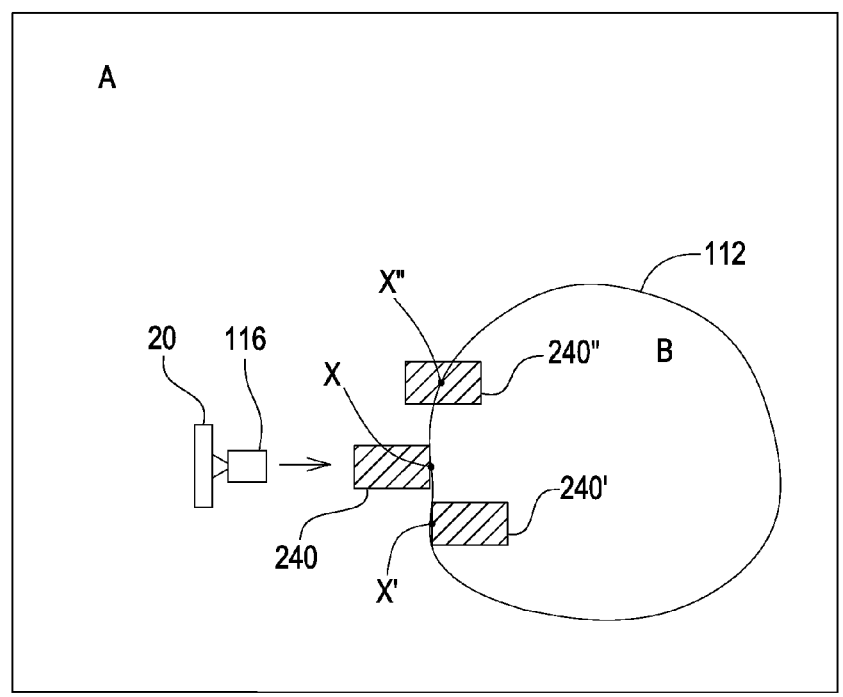
FIG. 13 is a plan view of a field illustrating areas of a field where seed varieties are mixed when a seed variety switch is made with a single gate switching mechanism.

The programmed quantity of seed has been described as the seed in the meter of a first variety that needs to be consumed before introduction of a second seed variety when making a switch in seed varieties to minimize mixing of seed varieties. The use of two gates 69, 70 in the switching mechanism 68 allows for both seed varieties to be stopped allowing the programmed quantity of seed in the meter to be consumed. If the switching mechanism only had one gate that has two positions, a first position allowing the first seed variety to flow into the meter and the block flow if the second seed variety and a second position that allows flow of the second variety while blocking flow of the first variety there would be no opportunity for blocking the flow of both varieties for a time to substantially empty the meter. The programmed quantity of seed however, can still be used with such a switching mechanism to at least control where in the field the mixed seed is planted. With a single gate switching mechanism, when the gate switches from variety A to variety B, there will be a programmed quantity of seed of variety A in the meter. At the switch, A is stopped and B is introduced into the meter along with the seed A. The seeds will mix and there will be a region in the field planted with the mixture of seed. Eventually, seed A in the meter will be completely consumed and the planter will only be planting seed B. The mixed seed area is shown as the hatched area 240 in FIG. 12 where the planter, when approaching switch point X switches the gate ahead of the point X such that when point X is reached, the planter is planting seed B at a specified level of purity, for example, at least 95% of seeds planted are seed B. By using the programmed quantity of seed and with testing knowledge from the seed meter, the length of the mixed seed area 240 can be determined. The mixed seed area 240 in FIG. 12 is located in the area of seed A such that the area in the polygon 112 will be planted with the desired purity of seed B. Alternatively, the mixed seed area 240' could be located inside the polygon 112 if desired. In yet another alternative, the mixed seed area 240" can straddle the boarder of the polygon 112. In some prescriptions, it may not matter where the mixed seed area is planted. But in some prescription, it may be important that within the polygon 112, the seed must be seed B. In such a case, the prescription can include the location of the mixed seed area and the controller is operated in accordance to make the switch such that the mixed seed area is on the proper side of the polygon 112.

Control of the switching of seed varieties has been described in the context of the programmed quantity of seed which is the quantity of held in the seed puddle or the seed in the seed puddle minus a minimum amount of seed that must be in the meter for proper functioning. The programmed quantity of seed could be used to derive a time or distance traveled from when the first seed variety is shut-off until the next variety is supplied to the meter. Time and distance can be determined from the programmed quantity of seed and the seeding rate and machine travel speed.

While the planter has been described in the context of applying seed, the above aspects can also apply to the application of chemicals such as fertilizers, pesticides, herbicides, etc. Different chemicals can be applied to different locations in the field and at different rates. The words "seed" and "seed variety" should be broadly construed in the claims that follow to include not just seeds but different fertilizer types and other chemical types applied to a field.

Having described the preferred embodiment, it will become apparent that various modifications can be made without departing from the scope of the invention as defined in the accompanying claims.

What is claimed is:

1. A seed distributing machine comprising:
    a seed meter having a housing to hold a pool of seed to be singulated and delivered sequentially;
    a seed sensor generating a signal for each seed delivered by the meter and passing the sensor,
    a seed delivery system to provide at least two different varieties of seed to the meter, the seed delivery system having a switching mechanism to change from a first variety of seed to a second variety of seed being delivered to the meter housing;
    a controller operating the switching mechanism to control which seed variety of the first and second seed varieties is delivered to the meter based on the location of the machine in a field; wherein the controller stops supplying a first seed variety to the meter before supplying a second variety to allow for substantial consumption of the first variety of seed in the seed pool prior to supplying the second variety of seed to the seed meter, the location of the machine in the field where supply of the first variety of seed to the meter is stopped is based on a programmed quantity of seed representing the quantity of seed in the seed pool and the seeding rate; wherein the controller determines the programmed quantity of seed in the seed pool for each variety of seed during a meter calibration process.

2. The seed distribution machine of claim 1 wherein the meter calibration process includes the steps of filling the meter housing with a first variety of seed, operating the seed meter, stopping the supply of the first variety of seed to the meter, continuing to operate the seed meter until the seed pool in the meter is exhausted while counting the number of seeds delivered by the seed meter after the supply of seed to the meter has been stopped wherein the number of seeds delivered by the seed meter after stopping the supply of the first seed variety to the meter is the programmed quantity of seed.

3. The seed distribution machine of claim 2 wherein the calibration process is performed while the machine is stationary.

4. The seed distribution machine of claim 3 wherein during the calibration process seed from the seed meter is collected for reuse.

* * * * *